Aug. 15, 1939. S. A. SNELL 2,169,888
MECHANISM CONTROL
Filed May 23, 1936 2 Sheets-Sheet 1
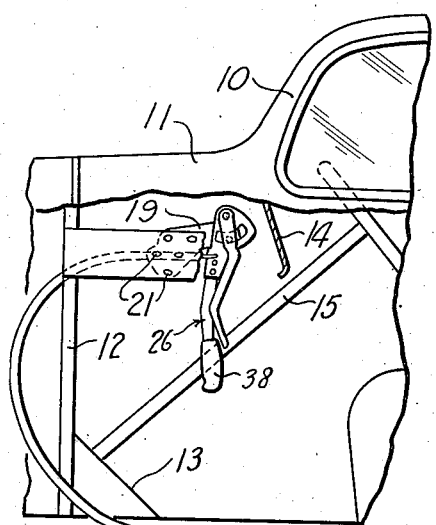
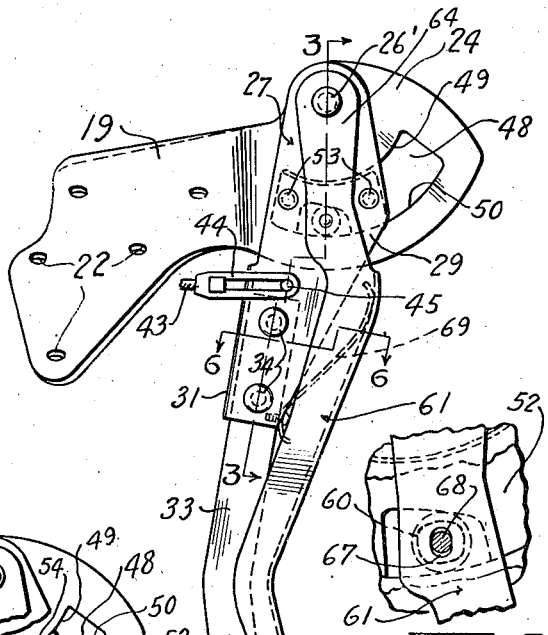
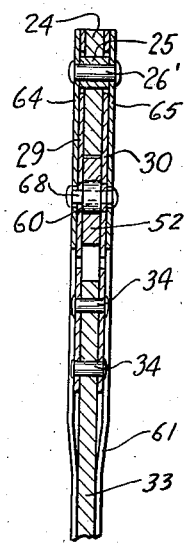
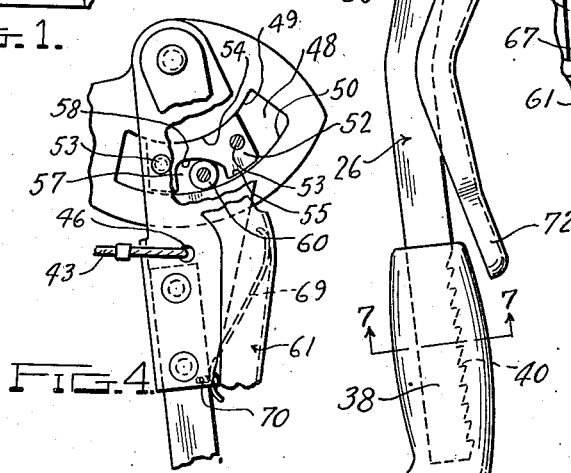
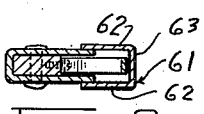
Inventor
Samuel A. Snell Aug. 15, 1939.  S. A. SNELL  2,169,888
MECHANISM CONTROL
Filed May 23, 1936  2 Sheets-Sheet 2
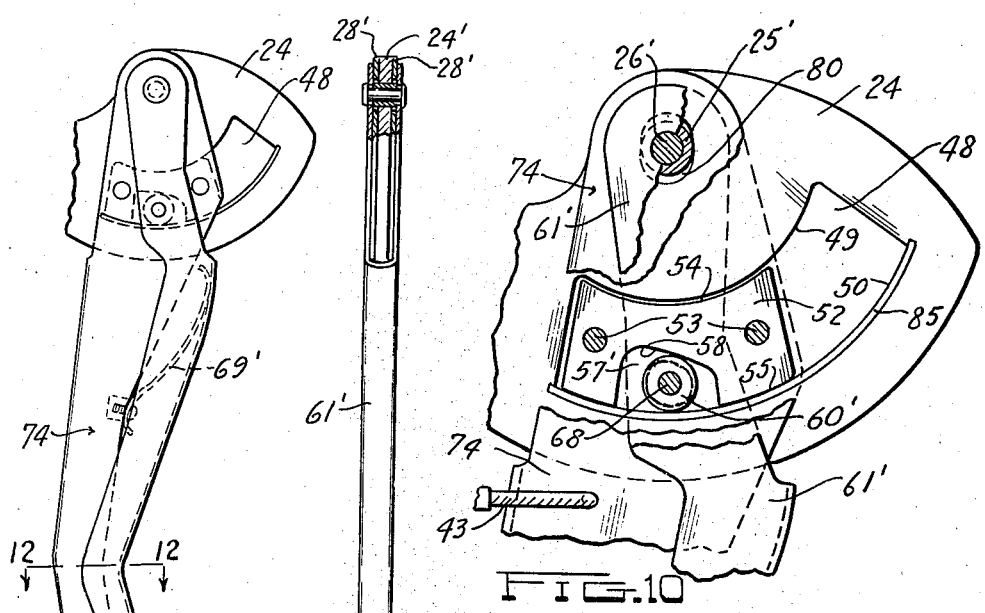
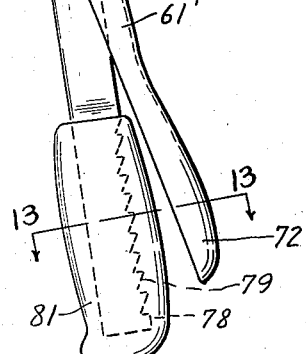
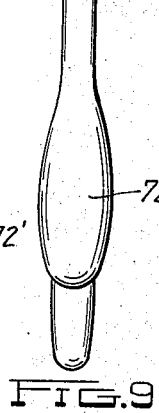
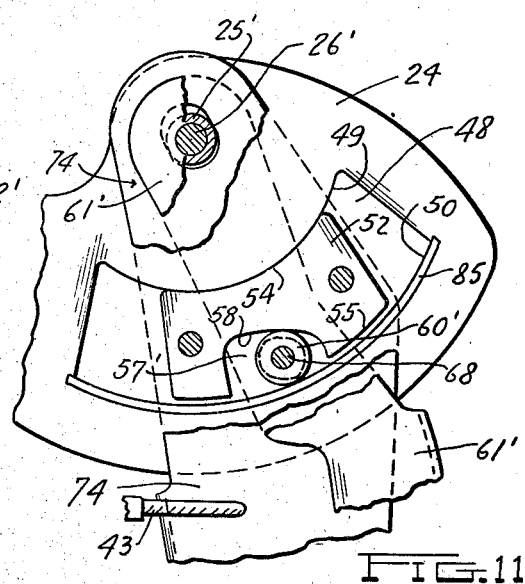
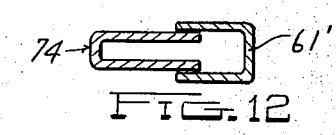
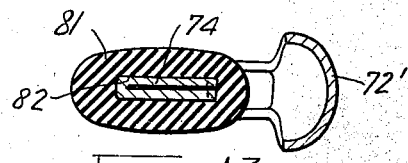
INVENTOR
Samuel A. Snell
BY
ATTORNEY Patented Aug. 15, 1939

2,169,888

UNITED STATES PATENT OFFICE 2,169,888

MECHANISM CONTROL

Samuel A. Snell, Toledo, Ohio, assignor, by mesne assignments, to The Logan Gear Company, a corporation of Ohio Application May 23, 1936, Serial No. 81,515

13 Claims. (Cl. 74—531)

This invention relates to control mechanism and particularly to a lever mechanism of a type suitably adapted for vehicle control or other apparatus.

The invention contemplates the provision of a lever mechanism embodying a clutching means wherein the mechanism may be adjusted and retained in any desired position.

The invention has for an object the provision of a lever and clutch arrangement particularly adaptable in controlling the operation of braking mechanisms wherein the extent of movement of the lever to brake setting position may vary under operating conditions, the clutching arrangement being of such nature as to retain the lever in any position of adjustment.

A further object of the invention is the provision of a lever arrangement wherein the same may be positively retained in any position and yet may be easily and quickly released with very little effort.

Another object of the invention is the provision of lever mechanism embodying a releasing means which may be co-extensive with a lever and arranged to cover portions of the lever, thus eliminating the necessity of applying a fine finish to certain parts of the lever.

A further object of the invention is the provision of a lever having a grip portion formed of moulded material such as rubber, phenol condensation product or other "plastic" which may be fabricated in various color schemes to match the other vehicle controls or interior appointments.

A further object of the invention is the provision of a lever mechanism wherein the major parts are formed from sheet material thus effecting substantial reduction in the expense of manufacture and assembly and enhancing the uniformity and interchangeability of parts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary side elevational view of the forward portion of an automotive vehicle, a portion of the side wall being broken away to illustrate a method of mounting the mechanism control arrangement of my invention;

Figure 2 is a side elevational view of one form of the mechanism control of my invention;

Figure 3 is a longitudinal sectional view taken substantially upon the line 3—3 of Figure 2;

Figure 4 is an elevational view of the upper portion of the mechanism control, certain parts being broken away;

Figure 5 is a fragmentary detail view showing the clutch arrangement and a portion of the releasing means therefor;

Figure 6 is a transverse sectional view taken substantially on the line 6—6 of Figure 2;

Figure 7 is a transverse detail sectional view taken substantially on the line 7—7 of Figure 2;

Figure 8 illustrates a modified form of mechanism control of my invention;

Figure 9 is a front elevational view of the upper portion of the mechanism control shown in Figure 8;

Figure 10 is an enlarged fragmentary detail view illustrating a form of clutch and related parts forming a part of the present invention and their relationship in normal or "brake released" position;

Figure 11 is a view similar to Figure 10 showing the clutch and related parts when the mechanism is moved to operative or brake setting position;

Figure 12 is a detail sectional view taken substantially on the line 12—12 of Figure 8;

Figure 13 is a sectional detail view taken substantially on the line 13—13 of Figure 8.

I have illustrated the mechanism control of my invention as particularly utilized as a means of emergency brake control for automotive vehicles, but it is to be understood that I contemplate the utilization of the invention in any type of mechanism where the control may be usable.

Referring to the drawings in detail and particularly Figure 1, I have illustrated the forward portion 10 of an automotive vehicle body of conventional design having a cowl portion 11, a dash portion 12, toe board 13, instrument board 14 and steering post or column 15. It has been found desirable to mount a brake control mechanism in such a manner that the same may be conveniently operated by the driver of the vehicle and yet be in a position which will not impede or handicap the vehicle operator. In the embodiment of the invention as illustrated, the control mechanism is preferably mounted adjacent the left side wall of the vehicle body as viewed from the driver's position and is carried by a support or bracket 19 secured to the cowl frame construction 20 or other suitable portion of the vehicle. The lever support is preferably mounted rearwardly of the dash board 12 and is held in place by a plurality of rivets 21 or other suitable means passing through openings 22 in the support illustrated in Figure 2.

The bracket 19 in the present embodiment forms a supporting means for the lever mechanism of my invention. The lever mechanism includes a lever or lever member 26 which is pivotally carried by the support 19, the latter being preformed with a uniplanar portion 24. The upper extremity of the lever member 26 is provided with a portion 27 having parallel side wall portions or projections 29 and 30 which in the embodiment illustrated in Figures 1 through 4 inclusive, are joined together by an integral lateral flange portion 31, the wall portions 29 and 30 being secured to a bar-like member 33 by means of rivets 34 passing through aligned openings in the portion 27 and the bar-like member. The side wall projections and the flange portion 31 are joined integrally forming a member designated by 27, but it is to be understood that the member 27 may be an integral formation with the portion 33 of the lever member as hereinafter described.

The parallel side wall projections 29 and 30 of the lever member are arranged to straddle the uniplanar portion 24 of the support 19 and are pivotally connected to the support by means of a pin or pintle 26', in the embodiment illustrated, the pin being surrounded by a bushing 25 upon which the lever member is journalled as a fulcrum. For simplification of assembly of the mechanism, it has been found desirable to utilize a separate bushing 25 in addition to the pin or pintle 26' although these elements may be integrally formed together without departing from the spirit of the invention. The opening in the lever accommodating the bushing is slightly larger than the bushing in order to permit the lever to have a limited vertical movement with respect to the support 19, which arrangement facilitates the manufacture and assembly of the mechanism as it is not necessary to maintain such a high degree of accuracy in fabricating certain parts of the mechanism as well as to accomplish other purposes as hereinafter explained.

In order to facilitate the actuation or manipulation of the lever mechanism, I have provided at the depending extremity of the lever member 26 a hand grip portion 38 which may be fabricated of moulded material such as rubber, phenol condensation product, or one of the usual well known "plastics" or other suitable material which is preferably formed to a configuration providing a grip portion which not only will conveniently accommodate the hand of the vehicle operator, but is of a configuration presenting a pleasing appearance. In the embodiment illustrated in Figure 2, the grip portion 38 is of moulded rubber which may be secured to the lever body member 33 in any desirable manner. In the form shown, the grip portion may be separately moulded with a central hollow portion and one edge of the member 33 serrated as at 40 to form teeth preferably of ratchet configuration. The grip portion may then be forced upon the extremity of member 33 to the proper position and the teeth of the serrated portion will embed in the rubber grip member and prevent its removal. By fabricating this grip portion of rubber or of phenol condensation product or other mouldable plastics or the like, various colors of hand grips may be obtained so that the structure may, if desired, conform in color scheme to the other interior appointments of the vehicle.

A force transmitting means in the form of cable 43 or other suitable means may be connected through the medium of a clevis 44 and a pin 45 to an opening 46 in the portion 27 of the lever member 26 or, if desired, the connection to the connecting cable may be made by suitable connection to the bar-like member 33 depending upon the power advantage desired for actuating the brake or other mechanism which may be connected to the cable 43.

My invention incorporates a clutching means for locking the lever member and associated mechanism in any position at which it may be adjusted and incorporates a simple yet effective releasing means. The uniplanar portion 24 of the bracket 19 is provided with a slot or opening 48 preferably having opposed arcuate surfaces or bounding edges 49 and 50 preferably generated as radii of different dimension about the axis of the pin 26' as a center. Positioned within the slot 48 is a block or member 52 which is secured by means of rivets 53 or otherwise fastened to the projections 29 and 30 of the member 26. The particular configuration of the block or abutment 52 is illustrated in Figure 4 having a curved or arcuate surface 54 which has substantially the same curvature as the wall 49 of slot 48, the lower edge wall of the block 52 having an arcuate configuration 55 of a curvature substantially coincident with the curvature of the wall 50 of the slot 48, there being sufficient clearance between the arcuate surfaces 54, 55 and 49, 50 so as to normally permit free slidable movement of the block 52 within the arcuate slot 48. The block 52 is provided with a recess 57 having a wall 58 of such contour as to form with the arcuate wall 50 of slot 48 a wedge shaped configuration. Positioned within this configuration or opening is a suitable clutching means in the embodiment illustrated, the same being a cylindrical member or roller 60.

One form of clutch actuating or releasing means of my invention is illustrated in the form of a member 61 having its major portion of U-shaped configuration as illustrated in Figure 6 with side wall portions 62 and a central bight portion 63 which terminates at its upper extremity in spaced parallel portions or projections 64 and 65 which straddle the uniplanar portion 24 of the support or bracket 19. The projections 64 and 65 are provided with aligned openings which also receive the rivet or pin 26', the latter acting as a pivotal axis for the clutch actuating member 61. The projections 64 and 65 are also provided with aligned slots or opening 67 through which extends a pin or rivet 68, the latter also extending through a central opening in the clutch roller 60. The elongation of the slots 67 in the embodiment illustrated is longitudinally of the member 61 so as to permit slight vertical freedom of movement of the pin 68 and the clutch roller 60 independent of the member 61 for a purpose to be hereinafter explained. The clutch actuating member 61 is preferably arranged to urge the clutch 60 toward clutching position under the influence of spring means. In the form of the invention illustrated, this spring means comprises a tension plate 69 which is secured to the bar-like portion 33 of the lever by means of a screw 70 or by welding or other suitable securing means, the free end of the spring extending within the U-shaped configuration of the member 61 and contacting with the wall 63 thereof to urge the latter away from the body portion of the lever. If desired, the spring means may be secured to member 61 with its free end contacting the lever member without departing from the spirit of the invention. The depending portion of the member 61 is preferably curved and formed as to provide a finger piece 72 as particularly shown in Figure 7, providing means engaged by the thumb of the vehicle operator to conveniently release the clutch mechanism. In a lever of this character the actuating member 61 being of suitable U-shaped configuration is so arranged as to embrace portions of the lever formed of members 27 and 33 and thus partially covers these members to conceal them from normal vision of the vehicle operator from the operator's position. Thus, it is ordinarily only necessary to polish or finish the exterior surface of the clutch actuating member 61 as this member together with the grip portion 38 is substantially the only portion of the control mechanism that is readily visible to persons occupying the seats of the vehicle. In this connection, it is to be noted that on most vehicles the instrument board 14, as indicated in Figure 1, substantially obscures the upper portion of the control arrangement of this nature from the view of the vehicle passengers so it is therefore unnecessary to apply a fine finish or polish to such visually obscured portions of the mechanism.

In the form of my invention illustrated in Figures 8 through 13, the lever member 74 is illustrated as fabricated of a piece of comparatively thin sheet metal or the like preferably folded to a U-shaped configuration to increase the strength of the lever member. The upper portion of the lever or lever member is formed with projecting spaced wall portions 28' which straddle the support 24' in the same manner as illustrated in the form of the invention disclosed in Figure 2. Immediately beneath the support or bracket 24' the wall portions converge yet continue the U-shaped configuration forming the lower portion of the lever member. The edge portions of the U-shaped configuration adjacent the lower extremity of the lever member are preferably notched or serrated as illustrated at 78 to form projections or teeth 79. The grip portion 81 is preferably fabricated of rubber, phenol condensation product or other plastic and is provided with a hollow portion 82 of a dimension to snugly fit the lower extremity of the lever member, the projections 79 engaging an inner wall of the grip portion to retain the latter in proper position on the lever member. In this connection it should be noted that it is preferable to employ ratchet type teeth on the lever member as illustrated as it facilitates the assembly in driving or forcing the grip member upon the lever member, the teeth being of such shape as to prevent ready removal of the grip member without disrupting or distorting the interengaging wall of the grip member with the toothed portion of the lever member. By this means of assembly, the grip member may be easily and quickly positioned and retained upon the lever member without the use of additional securing means.

In the form of the invention illustrated in Figures 8 through 13, the clutch actuating and controlling member 61' is of a configuration similar to the clutch actuating member 61 hereinbefore described with the modification that the lower extremity is curved to conform generally to the curvature of the adjacent portion of the grip member and thus provides a manipulating means 72' which conveniently accommodates the hand of the vehicle operator. A plate spring 69' is also interposed between the lever member 74 and the clutch releasing or actuating member 61' to normally urge the clutch roller toward clutching position. When it is desired to release the lever of this character, the depression of the portion 72' of the clutch actuating member by the operator causes relative movement of the member 61' with respect to the lever member 74 to release the clutch roller and permit the lever member to be swung in a clockwise direction to release the brakes.

In both forms of the invention illustrated, it is desirable for the successful construction and operation of the arrangement of my invention that there be clearance either between the point of connection of the clutch roller with the clutch actuating member or clearance between the clutch actuating member and its pivotal connection with the lever member or, as illustrated in Figure 9, clearance between the clutch releasing member and its point of pivotal support on the bracket, in order to permit the clutch actuating member to have limited vertical longitudinal movement. In connection with the first described form of the invention and as illustrated in Figure 3, this movement or clearance between the point of connection of the clutch roller with the clutch actuating member permits the clutch roller to center itself freely in wedging position between the arcuate wall 50 of the support 24 and the wall 58 of the block 52 so as to relieve excessive strain upon the pivotal connection of the clutch actuating member. It is also desirable that the lever member at its point of pivotal connection with the support 24 have slight clearance in order to permit limited relative longitudinal or lengthwise movement of the lever or lever member with respect to the support or bracket so that the clutch roller may urge or wedge the block 52 tightly in engagement with the arcuate wall 49 as illustrated in Figure 11 in clutched or brake setting position without placing substantial strain upon the pivotal support of the lever. This clearance also provides a means for compensating for minor inaccuracies in manufacture or assembly of clutching block 52 with the lever member in respect to their position relative to the lever support. This clearance between the bracket 24 and the lever member is illustrated in Figures 10 and 11 wherein the bushing 25' is accommodated in a slightly enlarged circular opening 80 while the opening in the clutch actuating member 61' is slightly larger than the diameter of the pin 26'. It is to be noted that the various elements in brake released position assume the position as illustrated in Figure 10 wherein the clutch roller 60' is substantially free in the slot or recess 57' while the upper surface of block 52 is out of engagement with the upper arcuate surface of the uniplanar portion 24 of bracket 19. When the parts are moved to brake setting position the various elements assume an arrangement as illustrated in Figure 11 with the clutch roller 60' in wedged position bringing the block 52 into frictional engagement with the upper arcuate wall of the portion 24 of the support. The clearance about the bushing 25' is sufficient to permit this upward movement of the block 52 into wedging or clutched position. By depressing the portion 72' of the clutch releasing member the roller 60' is moved away from wedging engagement with block 52 and the lower arcuate wall in portion 24 of the supporting bracket, thus permitting block 52 to recede from frictional engagement with the upper arcuate wall so that the parts may be permitted free movement to the position illustrated in Figure 10.

In the arrangement above described, in connection with the modification shown in Figures 8 through 13, inclusive, the lower arcuate wall of the uniplanar portion 24 of the bracket 19 is fitted with a hardened steel insert 85 so as to minimize the wear of this portion by reason of the wedging or clutching engagement hereinabove described. The seat member is preferably of dimension such that it may be tightly pressed into position and thus be retained in the supporting bracket.

It is apparent that within the scope of the invention modifications and different arrangements may be made other than is herein disclosed, and the present disclosure is illustrative merely, the invention comprehending all variations thereof.

What I claim is:

1. An emergency brake control mechanism comprising a support; a lever member depending from said support; said lever having a body portion including a bar-like section and a portion including spaced parallel projections, said projections adapted to straddle a portion of said support and having pivotal connection therewith; clutching means cooperating with said support and said lever including a clutch roller; clutch releasing means having pivotal connection with said lever member, said clutch releasing means having vertically elongated slots; means cooperating with said clutch roller extending into said slots, said slots permitting independent movement of said clutch roller with respect to said clutch releasing means when said clutch roller is moved to clutching position.

2. In combination, a control mechanism including a support; a lever member having pivotal connection with said support; an abutment on said lever member; a clutch roller cooperating between said support and said abutment for retaining the lever member in adjusted position; means including a lever element pivotally connected to said lever member and extending substantially the length of said lever member and positioned adjacent thereto; said element being capable of movement independent of said member for releasing said clutch roller.

3. In combination, a lever mechanism including a support; a lever member pivotally associated with said support; said support having an arcuate slot therein; said lever having a portion positioned within said slot and normally capable of slidable movement therein; a clutch roller interposed between the portion of said lever member in said slot and a wall of said slot; means urging said clutch roller toward clutching position whereby the portion of said lever extending in said slot is caused to frictionally engage a wall of said slot; and clutch releasing means arranged for relative movement independent of said lever member for releasing said clutch roller.

4. In combination, a lever terminating at one end in spaced parallel projections; a clutch roller associated with said projections; a hand grip portion formed of phenol condensation product secured to the other end of said lever; clutch controlling means associated with said lever and having a portion of U-shaped configuration adapted to straddle a porton of said lever; said clutch controlling means having a manipulating portion positioned adjacent the grip portion of said lever member.

5. In combination, a control mechanism including a support; said support having an arcuate slot therein; a lever member pivotally connected to said support; an abutment carried by said lever member; a clutch roller positioned in said slot and cooperating with said abutment; clutch releasing means having pivotal connection with said lever member; spring means cooperating with said lever member and said clutch releasing means normally urging said clutch roller toward clutching position in engagement with a wall of said slot and said abutment.

6. In combination, a control mechanism including a support; said support having an arcuate slot therein; a lever member pivotally connected to said support; a block carried by said lever member; a clutch roller positioned in said slot and cooperating with said block; clutch releasing means having pivotal connection with said lever member at the axis of connection of said lever member to the support; and spring means normally urging said clutch roller toward clutching position in engagement with a wall of said slot and said block.

7. In combination, a control mechanism including a support; a lever member pivotally connected to said support; said support having a clutching surface; clutch means including a roller interposed between said member and said clutching surface to retain the control mechanism in adjusted position; a clutch releasing lever having pivotal articulation with and positioned adjacent said lever member; said clutch releasing lever extending substantially full length of said lever member and terminating in a grip portion adjacent the extremity of said lever member; said clutch releasing lever having cooperative connection with said clutch roller whereby movement of the clutch releasing lever independently of said lever member releases said clutching means.

8. In combination, a control mechanism, including a support; said support having an arcuate slot therein; a lever member connected to said support and arranged for limited lost motion with respect thereto; clutch means positioned in said slot; clutch releasing means having limited lost motion connection with said lever member; spring means cooperating with the lever member and the clutch releasing means normally urging said clutch means toward clutching position.

9. In combination, a control mechanism, including a support; said support having an arcuate slot therein; a member secured in said slot having a clutch surface; a lever member connected to said support and arranged for limited lost motion with respect thereto; clutch means positioned in said slot and cooperating with said clutch surface; clutch releasing means having limited lost motion connection with said lever member; spring means cooperating with the lever member and the clutch releasing means normally urging said clutch means toward clutching position.

10. An emergency brake control mechanism comprising a support and having an abutment surface; a lever member depending from said support; a pin transversely positioned in said support, the side wall of said lever member having an opening through which said pin projects, the opening being larger than said pin; a clutch roller associated with said lever member, said clutch roller cooperating with said abutment surface and the support for retaining the lever member in fixed position; clutch releasing means associated with said lever member; resilient means normally urging said clutch roller toward clutching position, the connection between the lever member and said pin providing limited movement of said lever relative to said support when said clutch roller is in lever member retaining position.

11. In combination, a control mechanism including a support having a slot therein; a lever member having a clutching surface formed thereon and pivotally connected to said support; said slot having a bounding surface of arcuate configuration; a clutch means cooperatively associated with an arcuate wall of the slot and the clutching surface upon said lever member; a clutch releasing means including an element extending substantially full length of said lever member and adjacent thereto; and resilient means associated with said element for urging said clutching means into clutching position with the clutching surface of said lever member and an arcuate wall of said slot to hold the lever member in adjusted position.

12. In combination, a control mechanism including a support; a lever member provided with a clutching surface and being articulated with said support, said support having a slot therein, one of the bounding surfaces of said slot being of arcuate configuration; a clutch means disposed between the arcuate surface of said slot and the clutching surface on said lever member for retaining the latter in adjusted position; and a clutch releasing means including a lever element extending substantially full length of said lever member and adjacent thereto.

13. In combination, a control mechanism including a support, said support having a slot of curved configuration therein; a lever member having a clutching surface and pivotally connected to said support; a clutch roller disposed between the clutching surface of said lever member and a wall of said slot for retaining the lever in adjusted position; a clutch releasing means; and resilient means for normally urging said clutching means toward clutching position in engagement with the clutching surface of said lever member and a wall of the slot.

SAMUEL A. SNELL.